POLYCRYSTALLINE SEMICONDUCTOR DEVICES

Filed Dec. 22, 1966 2 Sheets-Sheet 1

Inventor
HENLEY F. STERLING
By A. L. Lessler
Attorney

Inventor
HENLEY F. STERLING

By A. L. Lessler
Attorney 3,467,557
Patented Sept. 16, 1969

3,467,557

POLYCRYSTALLINE SEMICONDUCTOR DEVICES

Henley Frank Sterling, Harlow, England, assignor to International Standard Electric Corporation, New York, N.Y., a corporation of Delaware Filed Dec. 22, 1966, Ser. No. 603,887
Claims priority, application Great Britain, Jan. 4, 1966, 277/66
Int. Cl. H01l 7/36
U.S. Cl. 148—175 4 Claims

ABSTRACT OF THE DISCLOSURE

A process for manufacturing a polycrystalline semiconductor junction device involving epitaxial deposition of semiconductor material of one conductivity type upon a substrate of polycrystalline semiconductor material of opposite conductivity type, said substrate being manufactured by means of the silver boat process. The silver boat process involves melting and subsequent resolidification of semiconductor material wherein the material is heated by radio frequency induction, the material being contained by a vessel of good thermal and electrical conductivity such that radio frequency currents (eddy currents) induced in the vessel interact with the currents induced in the molten material to "levitate" the molten material away from the adjacent surface of the vessel.

Related patents

The silver boat process employed in the practice of this invention is related to the process described in U.S. Patent No. 3,172,734.

Background of the invention

The invention relates to the manufacture of semiconductor devices, in particular to polycrystalline devices.

For the purpose of this specification the term "silver boat process" is defined as meaning a method of heating a charge of material by the resistive heating action of radio frequency currents induced in the body of said charge, said charge being affected by radio frequency currents flowing in the walls of the container of said charge, said container having hollow walls through which a cooling fluid may be circulated, said container having a thermal conductivity of not less than 0.49 gram calories per sec. per cm.$^2$ (per ° C. per cm.) and a bulk resistivity of not more than 2.665 microhms per cm.$^3$ at 0° C.

Almost without exception semiconductor junction devices have been made from monocrystalline material because for most applications available forms of polycrystalline material have proved unsatisfactory. The lack of success of devices made from polycrystalline material has generally been attributed to the fact that in such material impurities either used as dopants or accidental impurities will diffuse further and faster along the grain boundaries than in the bulk of the material. For this reason it has proved practically impossible to get anything but irregular p-n junctions in such material, or junctions which are completely shorted electrically by impurity paths at the grain boundaries.

This problem of impurity diffusion along grain boundaries is not limited to devices made by a diffusion process but also applies to devices made by an epitaxial process because for epitaxial growth to occur the substrate has to be heated to a sufficient temperature to allow a certain mobility of the condensing atoms to enable them to migrate to positions conforming to the crystalline lattice of the substrate, and this temperature is also sufficient for significant diffusion of impurities to occur along grain boundaries.

However we have found that devices can be made from polycrystalline material which has been melted and resolidified in the silver boat process where the junctions are made by epitaxy.

Summary

According to the invention there is provided a method of manufacturing semiconductor polycrystalline junction devices on a substrate of polycrystalline material wherein said polycrystalline material is obtained from a charge of said material which has been melted by means of the silver boat process and subsequently resolidified, and wherein the polycrystalline material so obtained from said silver boat process is used as a substrate on which is deposited one or more layers of isomorphic crystalline material.

Detailed description

The features of the invention will be evident in the following description of the production of a polycrystalline silicon diode having Zener junction breakdown characteristics, embodying the invention in its preferred form.

The first part of this description refers to a silver boat apparatus in which a charge of silicon containing impurities is zone refined, and then zone levelled in the presence of a dopant. During this process the material is caused to melt and then resolidify and so the final crystalline state is suitable for the manufacture of polycrystalline devices.

Figure 1:
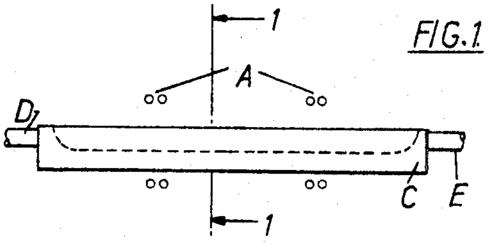
FIG. 1 is a side view of an apparatus for processing semiconductor material.
Figure 2:
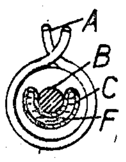
FIG. 2 is a cross sectional view on the line 1—1 of FIG. 1.

Referring to the drawings and first to FIGS. 1 and 2, a crucible C of copper has in cross-section the form of a hollow half torus, through which cooling water F is circulated by pipes D and E. A rod of silicon B to be zone refined is contained within the crucible C. High frequency heating coils A are placed around the crucible in the places shown in FIG. 1.

As silicon is of very high resistivity when at room temperature a susceptor (not shown) is initially placed in a position adjacent to one of the coils A and heats the silicon B by radiant heat to a temperature sufficient to reduce its resistivity to an extent to allow eddy currents to be induced therein. This preheater (susceptor) is then removed. The current in the heating coil A may be adjusted so that the electromagnetic field resulting therefrom from currents induced in the metal of the crucible C reacts with the current induced in a molten zone of the material B in such manner as to raise or "levitate" such molten zone away from contact with the metal of the crucible. For this purpose the crucible should be so located with respect to the heating coil that the silicon lies below the center of the coil and the reaction between (i) the electromagnetic field of coil A and (ii) the field due to currents induced in the wall of the crucible immediately adjacent to the silicon with (iii) the field induced in the molten zone of silicon lifts that zone upwards in the drawings.

This arrangement leads to economy in the power needed by reducing heat loss from the molten zone to the metal of the crucible, and reduces the possibility of the melt being contaminated by substances in the crucible material.

The heat treatment is carried out in an atmosphere of a protective gas such as argon and the crucible C is therefore contained in a chamber in which this protective atmosphere can be maintained.

Figure 3:
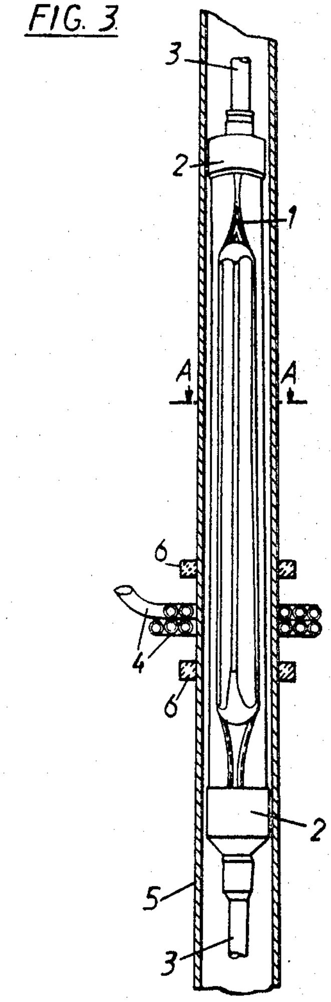
FIG. 3 is a plan view of another apparatus for processing semiconductive material, with part shown in section.
Figure 4:
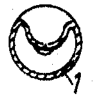
FIG. 4 is a cross sectional view of the line A—A of FIG. 3.

In the apparatus shown in FIGS. 3 and 4 the crucible 1 is formed from a hollow cylinder of silver having copper rings 2 welded on its ends. The copper rings 2 are closed at one end of each except for apertures communicating with copper pipes 3. The dimensions of one tube 1 which has been successfully used are: length between copper and pieces 15 inches, diameter 1¼ inches. The crucible is formed by pressing into the shape shown in the drawings, the maximum depth of the depression formed being a little over half an inch. In operation cooling water is circulated through the hollow space below the depression. An induction heater 4 consisting of hollow copper tubes wound in a coil surrounds a part of the crucible 1. Cooling liquid may then be circulated through these hollow copper tubes. The crucible 1 is placed within a tube 5 made of silica in order that the material in the crucible can be surrounded by a protective atmosphere, the induction heater 4 being exterior to the tube 5. The crucible 1 is then pushed or pulled, by means hereinafter described, so that the full length of the crucible 1 passes the coil 4.

The apparatus shown in FIGS. 3 and 4 is used in the zone refining of silicon. As silicon is of extremely high resistance when cold it is difficult to induce currents therein. Initially, therefore, susceptor rings 6 are placed in the neighborhood of coil 4 and are heated by induction from the coil 1. Radiant heat from the rings 6 then raises the temperature of the silicon sufficiently to lower its resistance and sufficient eddy currents are then induced therein to melt the silicon in a limited zone immediately adjacent the coil 4. The susceptor rings 6 are then moved away.

The temperature gradient on either side of the limited molten zone is very sharp since the silicon is cooled by the circulation of water through the hollow crucible walls. The temperature gradient does, however, permit of the molten zone ring progressively traversed along a rod of silicon lying in the crucible, the material immediately ahead of the molten zone in the direction of movement being of sufficient high temperature to have currents induced therein when this material reaches the center of the coil.

Figure 5:
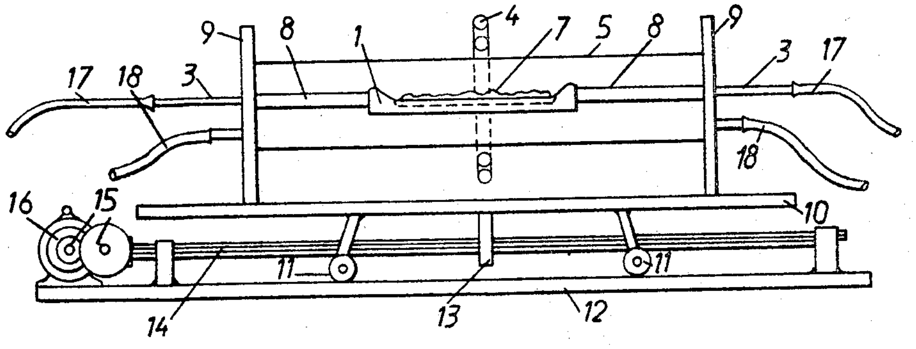
FIG. 5 is a diagrammatical view illustrating one manner of operation of the apparatus.

The means for causing the traversal of the molten zone is shown diagrammatically in FIG. 5.

In this figure silicon 7 is shown contained within a crucible 1 of the kind above described. The copper pipes 3 pass through the center of tubular supports 8 secured to end plates 9. A silica tube 5 surrounds the crucible 1 and is secured to the end plates 9 in gas tight manner. End plates 9 are mounted on a platform 10 which is in turn supported on wheels 11 running on a track 12. Extending from platform 10 is a nut 13 engaged by a lead screw 14 rotatable through gearing 15 from a motor 16.

Flexible hose 17 serves to circulate cooling water via copper pipes 3 through the hollow walls of crucible 1.

A protective gas such as argon is circulated through the silica tube 5 by a flexible hose 18. By adjusting the speed of the motor 16 the platform 10 carrying the crucible 1 within the protective gas atmosphere may be traversed past a stationary heating coil 4 to carry out the process of zone refining at any speed found necessary or desirable and by reversing the direction of rotation of the motor 16 passes of the silicon 7 may be given in alternate directions.

The process of zone refining is followed by a similar process using the same apparatus for zone levelling employing phosphorus as the dopant so as to produce a bar of n-type polycrystalline silicon of approximate resistivity 0.01 ohm cm.

Figure 6A:
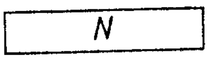
FIG. 6 is a diagrammatic representation of successive stages in the construction of a mesa diode.
Figure 6C:
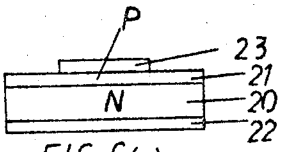
Figure 6B:
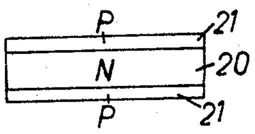
Figure 6D:
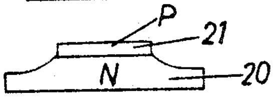

The resultant n-type bar is then cut by a diamond saw into silicon slices of approximately twelve thousandths of an inch in thickness; since the n-type silicon is polycrystalline there is no need for orientation of the bar when cutting. The slices of n-type polycrystalline material 20 (FIG. 6*a*) can then be treated in similar manner to monocrystalline material, viz. these slices are ground, polished, cleaned and mounted in epitaxial deposition apparatus (see, e.g., U.S. Patent No. 3,165,811) whence silicon doped with boron from boron tribromide is grown on one side to a depth of approximately 10 microns (FIG. 6*b*). Each slice can then be "measured," black wax 22 being applied to the n-type side, and a mask 23 (FIG. 6*c*) applied by a photo-lithographic method to the p-type side; the latter side may then be selectively etched by a mixture of hydrofluoric acid, nitric acid and water. The remaining black wax is dissolved by trichlorethylene to leave free dice (FIG. 6*d*). After cleaning, ohmic connections may be made to each mesa to produce a diode having Zener junction breakdown characteristics.

While the description of the manufacture of the diode has included the steps of zone refining and zone leveling it is to be clearly understood that these do not of themselves comprise an essential part of the inventive process and therefore if polycrystalline material of suitable purity and doping were available these steps could be omitted and replaced by a single step, i.e. the mere melting and resolidifying of such material in a silver boat apparatus. This single step is essential to the invention and is incorporated in the zone refining and zone levelling techniques.

For the preparation of monocrystalline semiconductive material, special apparatus and critical thermal conditions must be employed and there is a limitation on the diameter of the crystal that may be made. Although the mechanism whereby polycrystalline material, prepared as hereinbefore described, is obtained in a condition suitable for the manufacture of semiconductor devices, is incompletely understood, advantages of its use include the use for larger area semiconductor devices since polycrystalline material may be prepared with a larger diameter than monocrystalline material; because manufacturing conditions are less critical, production of polycrystalline material is easier and cheaper.

It is to be understood that the foregoing description of specific examples of this invention is made by way of example only and is not to be considered as a limitation on its scope.

I claim:

1. A process for manufacturing a semiconductor device, comprising the steps of:

melting and resolidifying a charge of polycrystalline semiconductor material by means of the silver boat process wherein said charge is melted by the resistive heating action from currents induced in said charge;

forming from said melted and resolidified charge a polycrystalline substrate having a major surface; and depositing by epitaxy an isomorphic layer of semiconductor material on said major surface.

2. A process according to claim 1, wherein said layer and the adjacent portion of said substrate are of opposite conductivity types forming a junction at the interface therebetween.

3. A process according to claim 2, wherein said polycrystalline material is silicon.

4. A process according to claim 2, comprising the additional step of forming ohmic contacts to said layer and said substrate.

References Cited

UNITED STATES PATENTS 3,013,192 12/1961 Starr -------------- 148—174

L. DEWAYNE RUTLEDGE, Primary Examiner

R. A. LESTER, Assistant Examiner

U.S. Cl. X.R.

23—273; 117—106, 201; 148—174; 252—62.3; 317—235